(No Model.)
D. V. BUTLER.
CASE HOOK AND HANDLE.
No. 510,526. Patented Dec. 12, 1893.
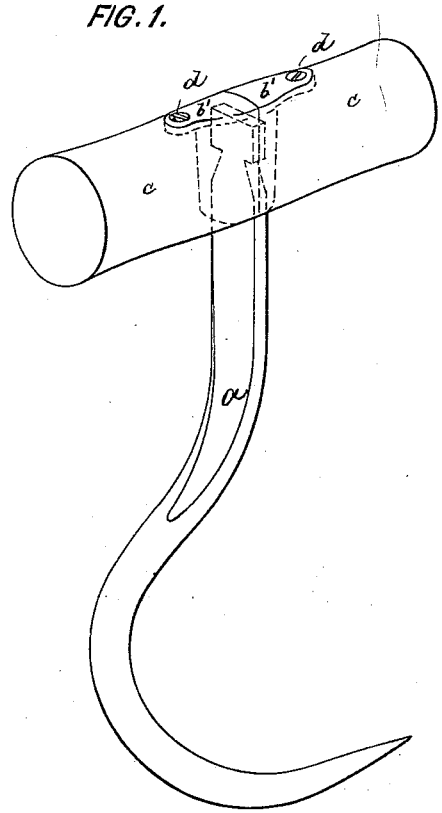
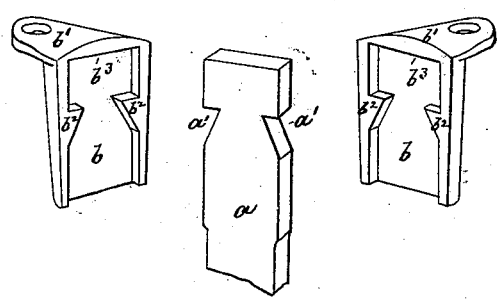
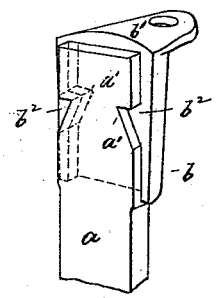
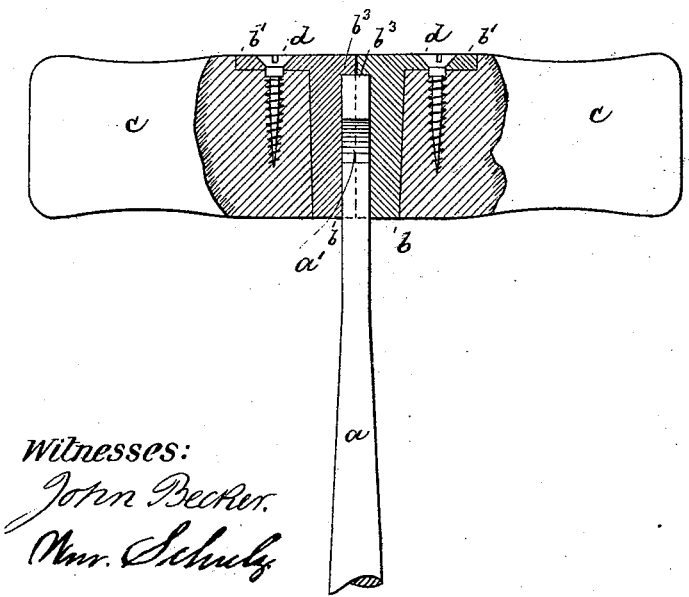
Witnesses:
John Becker.
Wm. Schulz
Inventor:
David V. Butler
by his attorneys
Roeder & Brieren

UNITED STATES PATENT OFFICE.

DAVID V. BUTLER, OF NEW YORK, N. Y.

CASE-HOOK AND HANDLE.

SPECIFICATION forming part of Letters Patent No. 510,526, dated December 12, 1893.

Application filed August 9, 1893. Serial No. 482,782. (No model.)

*To all whom it may concern:*

Be it known that I, DAVID V. BUTLER, of New York city, New York, have invented an Improved Hand-Hook, of which the following is a specification.

This invention relates to a hand hook for handling hay, packing cases and other articles, and which is so constructed that a very firm connection is established between the hook and its handle.

In the accompanying drawings: Figure 1 is a perspective view of my improved hand hook. Fig. 2 is a longitudinal section through the handle. Fig. 3 are perspective views of the divided socket and notched upper end of the hook shank, and Fig. 4 a perspective view showing the hook shank inserted within the socket.

The letter $a$, represents a hook, the shank of which is adapted to be secured to a handle $c$. This handle is perforated at the center for the admission of the upper end of the hook shank and of a divided tubular socket $b$, that incloses the same. Each socket half $b$, is provided with the lug $b'$, projecting at right angles to the body of the socket, and countersunk into the handle (Fig. 2). Screws $d$ passing through the lug $b'$, serve to attach the socket to the handle. The cavity of the socket $b$ is contracted or provided with inwardly projecting shoulders $b^2$, adapted to engage corresponding notches $a'$ of the hook shank. The socket is provided at the top with a flange $b^3$, to inclose the upper edge of the hook and prevent it from working upward under pressure. To put the parts together, the hook-shank is fitted into the divided socket, the latter is slipped into the perforation of the handle, and the screws $d$ are driven home, when all the parts will be firmly connected.

The principal advantage connected with my improved hand hook is that it is attached to the handle in such a manner that it cannot work loose under the most severe strain.

What I claim is—

The combination of a transversely perforated handle with a divided tubular socket therein having inwardly projecting shoulders $b^2$, an upper flange $b^3$, and laterally projecting lugs $b'$, and with a hook having a notched shank that is engaged by said socket, substantially as specified.

DAVID V. BUTLER.

Witnesses:
NELSON B. HAYNOR,
EDMUND S. BUTLER.